United States Patent [19]

Cole

[11] Patent Number: 4,635,835
[45] Date of Patent: Jan. 13, 1987

[54] CARRIER APPARATUS FOR ALL TERRAIN VEHICLE

[76] Inventor: Daniel L. Cole, 5914 W. Kathleen Rd., Glendale, Ariz. 85306

[21] Appl. No.: 813,488

[22] Filed: Dec. 26, 1985

[51] Int. Cl.⁴ .............................................. B60R 9/00
[52] U.S. Cl. .......................... 224/42.08; 224/42.03 B; 414/462
[58] Field of Search ............... 224/42.03 R, 42.03 B, 224/42.06, 42.07, 42.08, 42.04

[56] References Cited

U.S. PATENT DOCUMENTS

| | | | |
|---|---|---|---|
| 3,103,289 | 9/1963 | Clary | 414/462 |
| 3,757,975 | 9/1973 | Sneider | 224/42.03 B X |
| 3,976,213 | 8/1976 | Ball | 414/462 |
| 4,003,486 | 1/1977 | Shoemaker | 414/462 |
| 4,171,077 | 10/1979 | Richard, Jr. | 224/42.03 B |
| 4,269,561 | 5/1981 | Rutten | 414/462 |
| 4,431,205 | 2/1984 | Speicher et al. | 224/42.03 B X |

Primary Examiner—Stephen Marcus
Assistant Examiner—Robert Petrik
Attorney, Agent, or Firm—Herbert E. Haynes, Jr.

[57] ABSTRACT

A carrier apparatus is disclosed for attachment to the back of a transport vehicle for carrying an all terrain vehicle thereon. The carrier apparatus includes a tongue having a yolk pivotably mounted thereon for movement between a loading position wherein it is attachable to the rear axles of the all terrain vehicle and a loaded position wherein the all terrain vehicle is supportingly carried on the tongue of the carrier apparatus.

14 Claims, 3 Drawing Figures

Fig—1

CARRIER APPARATUS FOR ALL TERRAIN VEHICLE

BACKGROUND OF THE INVENTION

1. Field of the Invention

This invention relates generally to apparatus for carrying one vehicle on another and more particularly to an apparatus for carrying a type of vehicle commonly referred to as an all terrain vehicle on the back of transporting vehicle such as an automobile, pick-up truck or the like.

2. Description of the Prior Art

In recent years, relatively small three and four wheel vehicles of the type commonly referred to as all terrain vehicles have been developed and their popularity has increased for recreational and light duty work related off-road activities. Such vehicles, hereinafter referred to simply as ATV's, are not licensed for highway use and therefore must be transported to and from suitable recreational or job sites.

Conventional transporting methods are being used such as in the beds of pick-up trucks, or in trailers. However, this means that if a person is to use a ATV for recreational or job related purposes he must have some sort of specialized licensed vehicle for transporting purposes.

If a person does not already own a pick-up truck, it simply is not economically feasible to buy a relatively expensive vehicle for the sole purpose of transporting a considerably less expensive ATV. Although the cost for purchasing, or having a special trailer made for ATV transporting purposes is considerably less than the purchase price of a pick-up truck, trailers are not without some shortcommings or drawbacks. Some people simply do not like trailers for various reasons such as their towing and other handling characteristics, or because of non-use storage problems, and the like.

To the best of my knowledge, no apparatus has been developed for allowing an ATV to be carried by a non-specialized vehicle such as passenger cars, vans and the like.

SUMMARY OF THE INVENTION

In accordance with the present invention, a new and useful apparatus is disclosed for demountable attachment on the rear of a transporting vehicle which allows an all terrain vehicle to be carried by the transport vehicle.

The ATV carrier apparatus of the present invention includes an elongated beam, or tongue, for demountable attachment to a conventional trailer hitch structure, of the type commonly referred to as a "receiver hitch", provided on the rear of the transport vehicle which is to transport the ATC. A yolk means is pivotably mounted on the rearwardly extending end of the elongated beam and the yolk means is configured for demountable attachment to the rear axles of an ATV to be carried. The yolk means is pivotably movable between a loading position wherein it is attachable to the axles of the ATV, and a loaded position wherein the ATV is supportingly carried by the ATV carrier apparatus.

When the yolk means is in the loading position, it will lie in a substantially horizontal plane for attachment to the rear axles of the ATV which at that time is resting on the ground proximate the ATC carrier apparatus. When the yolk means is in engagement with the axles of the ATV and is lockably secured thereto, the rear end of the ATV is lifted so as to move the yolk means into its loaded position. In the loaded position, the yolk means is pivotably moved through more than 90° of rotation so that it extends upwardly from the elongated beam and angularly toward the rear of the transport vehicle. When this first part of the loading operation is accomplished, e.g. lifting the rear of the ATV to move the yolk means to the loaded position thereof, the rear wheels of the ATV will be supportingly carried at an elevated position above the elongated beam, and the front wheel, or wheels, will be resting on the ground. The next portion of the loading operation is then accomplished by lifting the front end of the ATV in a rotating movement about its rear axles until the front wheel, or wheels, are elevated relative to the ATV carrier apparatus.

All ATV's are provided with what is commonly referred to as a "back bar" which is a loop-like frame element projecting rearwardly from the ATV just below its seat. When the ATV is in the hereinbefore described fully loaded position, the back bar of the ATV will be received in a seat means provided on the elongated beam member of the ATV carrier apparatus. The seat means is configured for lockable attachment to the back bar of the ATV to positively secure the ATV in its loaded position.

With the axles of the ATV lockably secured in supported engagement with the yolk means, and the back bar of the ATV lockably supported in the seat means, the ATV will be entirely supported on the ATV carrier apparatus of the present invention in an attitude wherein the longitudinal axis of the ATV is sloping upwardly and angularly toward the rear of the transport vehicle. When in this attitude, the center of gravity of the ATV will exert a downwardly directed force on the ATV carrier apparatus at a point which is spaced from the pivot axis of the yolk means toward the rear of the transport vehicle. This, along with the locked attachment of the axles and back bar of the ATV, provides a positive highly stabilized supported carrying of the ATV on the ATV carrier apparatus of the present invention.

As is known in the art, an ATV of the three wheel type weighs about 250-300 pounds, depending on the particular model equipment provided, and the like, and the bulk of the weight is in the engine located in about the middle of the ATV. As a result of this, a single individual can load the ATV, in a manner described above, on the ATV carrier apparatus of the present invention. In the initial loading stage, the front wheel, or wheels, stay on the ground and therefore carry a good part of the total weight of the ATV, and the lifting and movement of the rear end of the ATV is guided by the attached yolk means. During the second stage of the loading the relatively light weight front end of the ATV is lifted in that the rear of the ATV is fully supported in the yolk means.

Accordingly, it is an object of the present invention to provide a new and useful all terrain vehicle carrier apparatus for demountable attachment to the rear of transport vehicle which allows that carrier vehicle to transport the all terrain vehicle.

Another object of the present invention is to provide a new and useful all terrain vehicle carrier apparatus of the above described character which is simple to attach to the transport vehicle and provides easy loading and unloading of the all terrain vehicle.

Another object of the present invention is to provide a new and useful all terrain vehicle carrier apparatus of the above described type which includes an elongated tongue which is demountably attachable to a trailer hitch receiver provided on the rear of the transport vehicle to accomplish the simple attachment of the carrier apparatus to the rear of transport vehicle.

Another object of the present invention is to provide a new and useful all terrain vehicle carrier apparatus of the above described character which includes a yolk means pivotably mounted on the rearwardly extending end of the elongated tongue for movement between a loading position for simplified attachment to the all terrain vehicle and a loaded position wherein the vehicle is supportingly carried on the carrier apparatus.

Another object of the present invention is to provide a new and useful all terrain vehicle carrier of the above described character which further includes a seat means on the tongue for lockably receiving the back bar frame member of the all terrain vehicle and supporting the vehicle in an angularly upright attitude of sloping toward the rear of the tranpsort vehicle for stabilized carrying of the all terrain vehicle on the carrier apparatus.

The foregoing and other objects of the present invention as well as the invention itself, may be more fully understood from the following description when read in conjunction with the accompanying drawings.

DESCRIPTION OF THE PREFERRED EMBODIMENT

Figure 1:
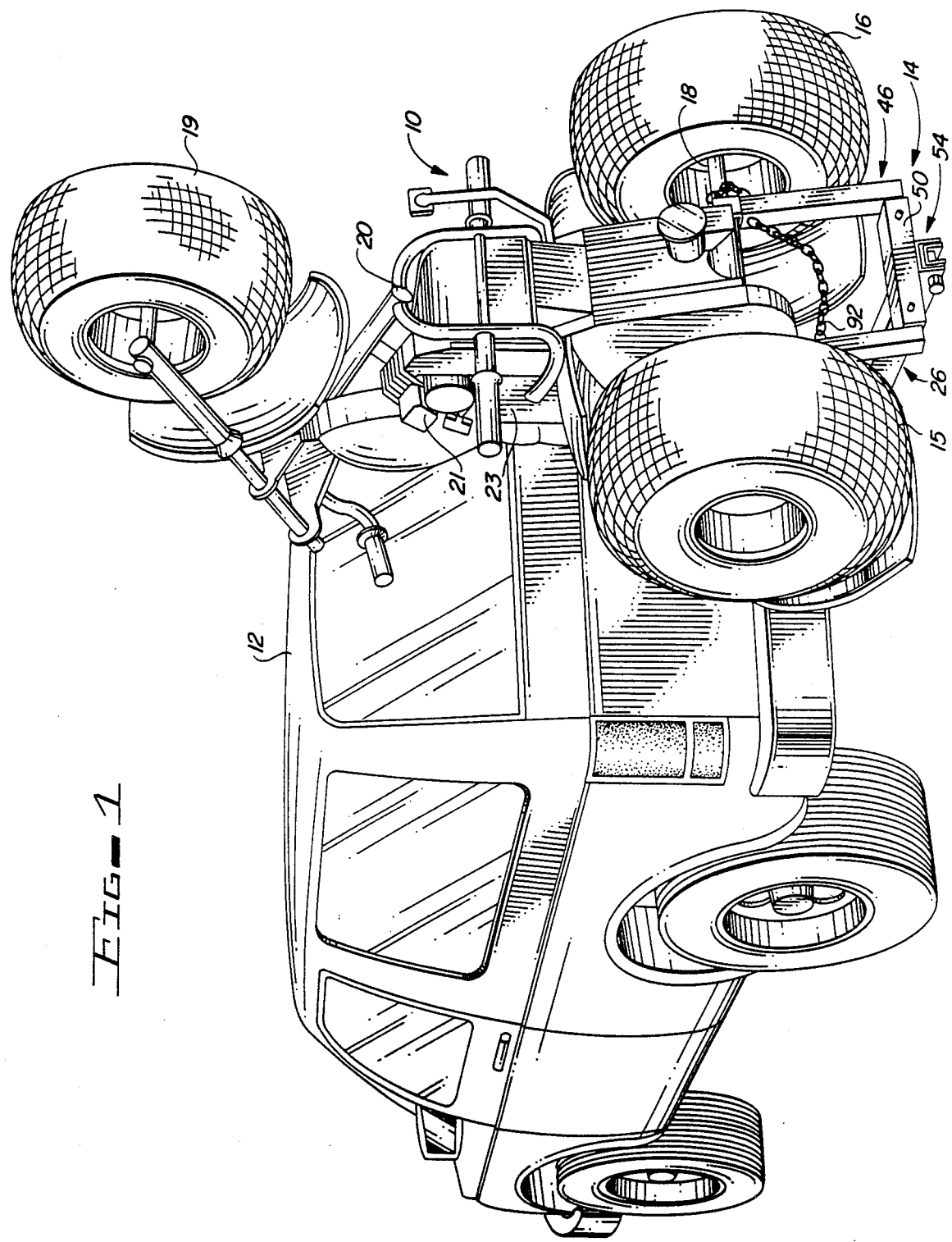
FIG. 1 is a perspective view showing a fragmentary portion of the rear of a typical transport vehicle having the ATV carrier apparatus thereon and also showing a typical all terrain vehicle being carried by the carrier apparatus.

Referring more particularly to the drawings, FIG. 1 best shows a typical all terrain vehicle 10, hereinafter simply referred as an ATV, as being carried on the back of a suitable transport vehicle 12 by means of the ATV carrier apparatus of the present invention which is indicated in its entirety by the reference numeral 14.

The illustrated transport vehicle 12 is intended to represent any of the well known highway or off-road vehicles, such as passenger cars, vans, pick-up trucks and the like, in that any vehicle of that type may be used in the practice of the present invention.

Figure 2:
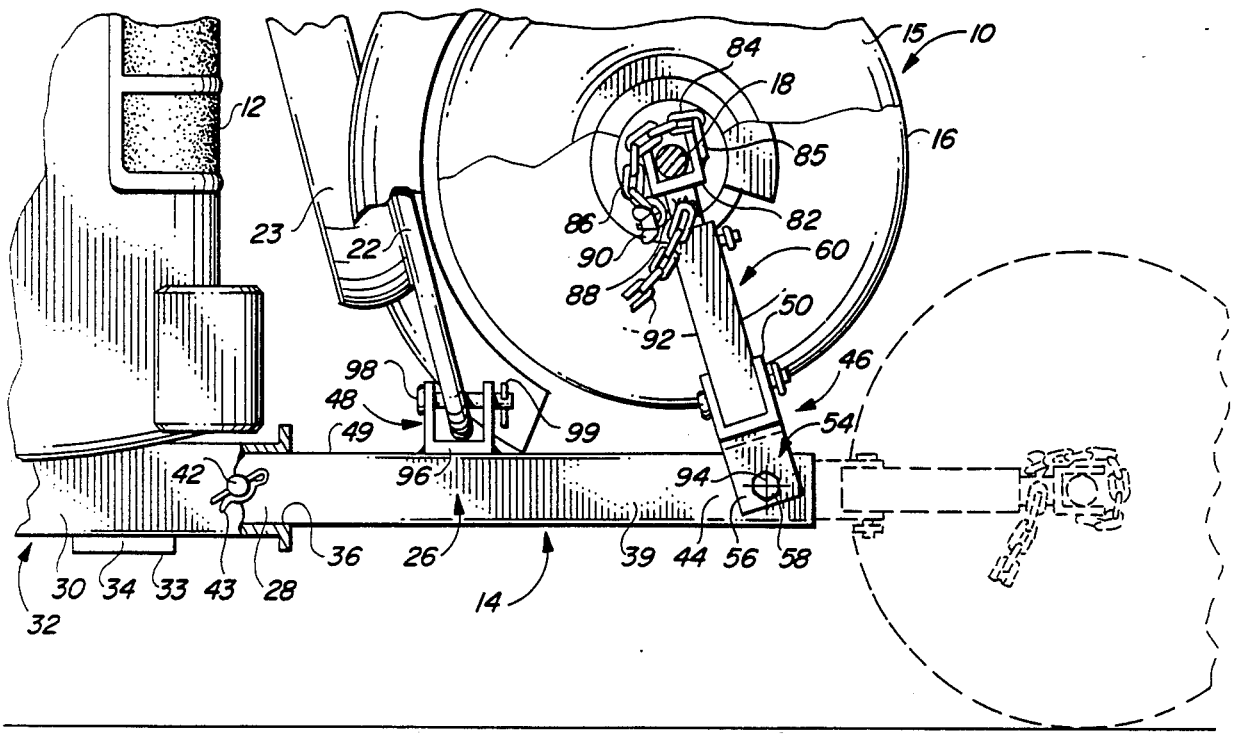
FIG. 2 is a fragmentary side elevational view illustrating the attachment of the ATV carrier apparatus to the transport vehicle and the attachment of the all terrain vehicle to the carrier apparatus.

The ATV 10 of the type illustrated is a single passenger relatively small vehicle weighing in the neighborhood of about 250-300 pounds depending on the particular model, engine size and the equipment provided thereon. The ATV 10 and a pair of rear wheels 15 and 16 which are carried on and driven by suitable rear axles 18 and a single front wheel 19 upon which are mounted very large low pressure tires. A suitable frame 20 is provided to support the engine 21 and various other components necessary for driving of the ATV. As seen in FIG. 2, the frame 20 has what is commonly referred to as a "back bar" 22 which is a loop-shaped bar structure that is an integral part of the frame 20. The back bar 22 extends rearwardly of the ATV from under the seat 23 thereof.

It is to be understood that the particular ATV 10 shown and described herein is not to be construed as a limitation of the present invention in that other configurations of vehicles of this same basic type can be transported by the ATV carrier apparatus 14 of the present invention. For example, four wheel ATV's (not shown) of the same general classification are available and are becoming increasingly popular.

Figure 3:
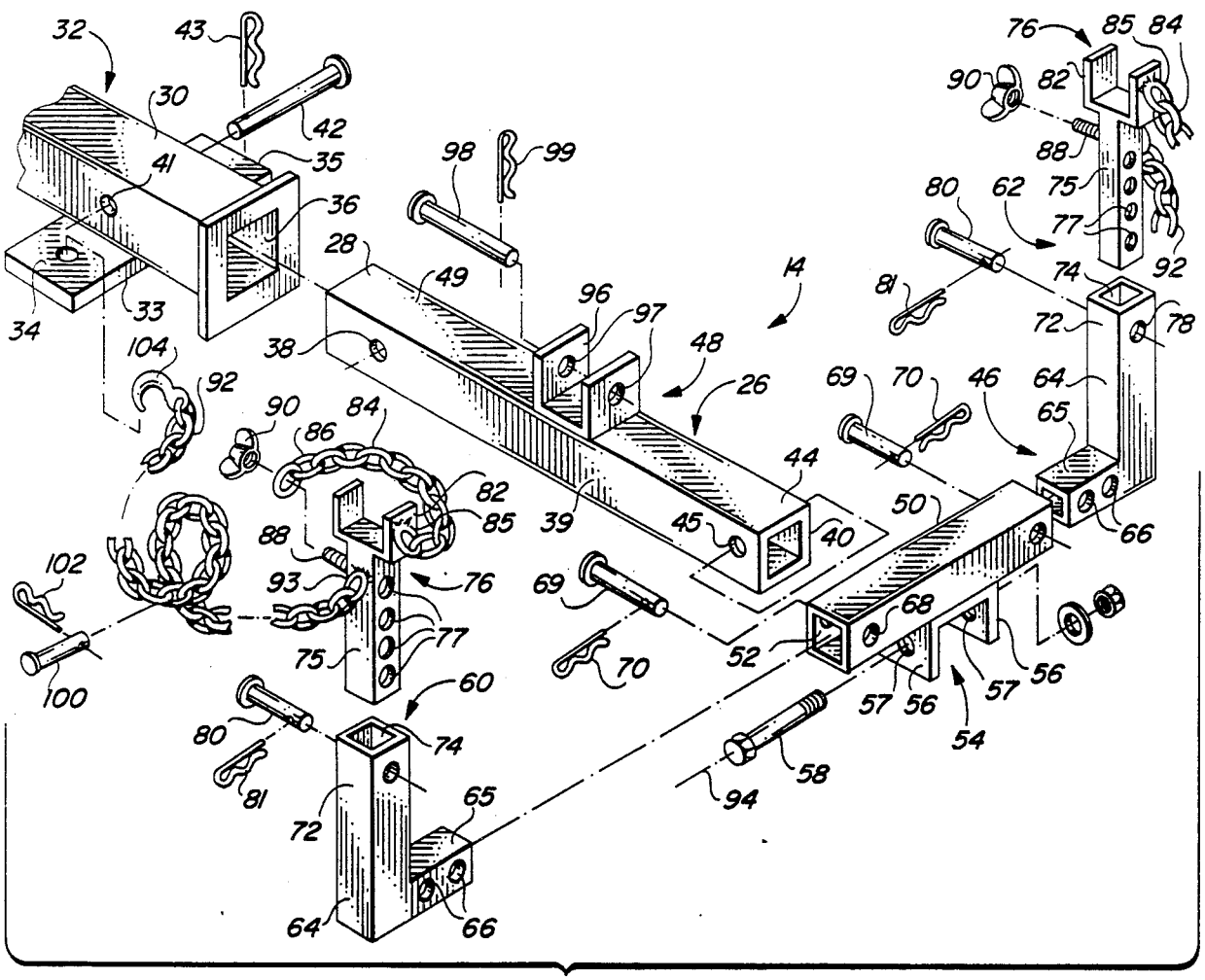
FIG. 3 is a perspective exploded view illustrating the various components and features of the present invention.

Reference is now made in particular to FIGS. 2 and 3 wherein the ATV carrier apparatus 14 of the present invention is best shown. The ATV carrier apparatus 14 includes an elongated beam, or tongue, 26 having a mounting end 28 which is adapted for telescopic demountable attachment to a sleeve-like member 30 which is part of a well known mechanism commonly referred to in the art as a "receiver hitch", with the receiver hitch being indicated generally by the reference numeral 32. The receiver hitch 32 is provided with a transverse plate 33 proximate the extending end of it sleeve so that the plate 33 provides laterally and oppositely extending ends 34 and 35. The receiver hitch 32 is also provided with suitable mounting elements (not shown) by which it is welded, bolted or otherwise attached to the frame (not shown) of the transport vehicle 12.

As hereinbefore mentioned, the receiver hitch 32 is a device well known in the art which is used, in conjunction with other suitable trailer hitch elements (not shown), for towing trailers and the like.

The mounting end 28 of the elongated tongue 26 of the ATV carrier apparatus 14 has a cross sectional configuration which matches that of the bore 36 of the receiver hitch sleeve 30 so that the mounting end 28 can be telescopically mounted in the bore 36 of the sleeve. The tongue 26 has a pair (one shown) of holes 38 alignly formed through its opposed sidewalls 39 and 40 at a location which is set back from the mounting end 28 thereof. When the tongue 26 is telescopically mounted in the sleeve 30, the holes 38 are aligned with similar holes 41 (one shown) provided in the sleeve 30 and a pin 42 with a retainer clip 43 is employed to secure the tongue 26 in the receiver hitch 32.

The elongated tongue 26 has an extending end or distal end 44 having an aligned pair of holes 45 (one shown) formed through its opposed sidewalls 39 and 40 for pivotable mounting of a yolk means 46 thereon. As will hereinafter be described in detail, the tongue 26 is also provided with a seat means 48 on its upper surface 49 at a location intermediate the mounting and extending ends 28 and 44, respectively, thereof.

The yolk means 46 includes a tubular cross beam 50 defining a bore 52 and having a clevis 54 welded or otherwise affixed so as to depend therefrom. The clevis 54 opens downwardly and has is depending lugs 56 spaced apart for being stradingly positioned on the extending end 44 of the tongue 26. The clevis 54 has holes 57 aligningly formed through the lugs 56 thereof and a suitable pivot pin 58, such as the illustrated bolt and nut arrangement, is passed thorugh the holes 57 of the clevis lugs 56 and the holes 45 of the tongue 26 so as to pivotably mount the cross beam 50 on the extending end of the tongue.

The yolk means further includes an identical pair of arm assemblies 60 and 62 which are carried by the cross beam 50 so as to extend oppositely from different ends thereof. Since the arm assemblies 60 and 62 are identical, the following detailed description of the arm assembly 60 will be understood to also apply to the other arm assembly 62.

The arm assembly 60 includes a right angle elbow structure 64 having a mounting end member 65 which is telescopically and adjsutably disposed in one end of the cross beam 50. The cross sectional configuration of the mounting end member 65 of the elbow matches the configuration of the bore 52 of the cross beam for telescopic disposition of the mounting end member 65 in the bore of the cross beam. The extended position of the elbow 64, and thus the entire arm assembly 60, relative to the cross beam 50 is adjustable, and to provide this capability, the mounting end member 65 of the elbow is provided with at least two sets of holes 66 (one hole of each set being shown) formed transversely therethrough. The extended position of the elbow 64 is selected by aligning a desired one of the sets of holes 66 with a similar hole set 68 provided in the cross beam 50, and utilizing a pin 69 having a retainer clip 70, to demountably and adjustably secure the elbow 64 to the cross beam 50.

The extending other end member 72 of the elbow structure 64, which is at a right angle with respect to the mounting end member 65 thereof as hereinbefore mentioned, defines a bore 74 for telescopic and adjustably extensible mounting of the shank 75 of a saddle means 76 therein. The cross sectional configuration of the shank 75 matches the configuration of the bore 74 of the elbow 64 to provide the telescopic mounting capability and plural sets of transversely aligned holes 77 are formed through the shank for selective alignment with a similar hole set 78 provided in the end 72 of the elbow for adjustment purposes. A suitable pin 80 and retainer clip 81 is utilized to secure the saddle means 76 in the desired adjustably extended position relative to the elbow 64.

The saddle means 76 further includes a clevis 82 affixed, such as by welding, on the extending end of the shank 75 and the clevis 82 is employed to receive one of the axles 18 of the ATV 10 as will hereinafter be described in detail. An axle tie-down means 84, such as the illustrated chain is further included as part of the saddle means 76. One of the ends 85 of the chain is attached to one side of the saddle means such as by being welded to the clevis 82. The other end 86 of the chain 84 is free to enable one of its links to be placed in looped over engagement with a threaded stud 88 that is located on the opposite side of the saddle means 76, such as being welded so as to extend from the shank 75. When an axle 18 of the ATV 10 is received in the clevis 82 of the saddle means 76, the chain 84 is looped over the axle, in the manner shown in FIG. 2, and the other end 86 of the chain is placed on the stud 88 and a suitable wing nut 90 is threadingly mounted on the stud to secure the chain in its axle tied down position.

A safety chain 92 has one of its ends 93 attached, such as by welding, to the saddle means 76 and the purpose for this safety chain 92 will hereinafter be described in detail.

The yolk means 46 described in detail above constitutes the preferred embodiment and it will be appreciated that various modifications could be made without changing the intended function and use thereof. For example, if a particular model ATV were to be carried, the telescopically adjustable capabilities of the elbow structure 64 and the saddle means 76 could be dispensed with. Further, the axle tie down means 84 could be in the form of a pin and retainer clip (not shown) instead of the illustrated chain.

OPERATION

The yolk means 46 is pivotably movable about a pivot axis 44, which is defined by the pivot pin 58, between an ATV loading position shown in dashed lines in FIG. 2 and an ATV loaded position shown in solid lines in the same figure.

When the yolk means 46 is in the ATV loading position, it will be disposed in approximately a horizontal plane so that the clevises 82 of the arm assemblies 60 and 62 will open rearwardly of the transport vehicle 12. When in this position, the ATV is maneuvered so as to position each of its axles 18 in a different one of the clevises 82. The axle tie down means 84 are then looped over the axles 18 and secured to the threaded studs 88 in the manner described above. The person doing the loading then grasps the back bar 22 of the ATV 10 and lifts the back end of the ATV in a manner which pivotably moves the yolk means 46 into the loaded position. This action places the rear wheels 15 and 16, and in fact the entire rear end of the ATV 10, in supported position over the ATV carrier apparatus 14, but the front wheel 19 is still resting on the ground. When this preliminary loading step has been accomplished, the person doing the loading then lifts the front end of the ATV 10 and swings it on its axles 18 into the position shown best in FIG. 1. When the ATV 10 is swung into the loaded position, the back bar 22 moves into received engagement with the hereinbefore mentioned seat means 48 provided on the elongated tongue 26. The seat means 48 is an upwardly opening clevis-like structure 96 having aligned holes 97 formed through its spaced apart lugs, and a suitable pin 98 with retainer clip 99 is used to secure the loop-shaped back bar 22 in the seat means.

From it above, it will be seen that when the ATV 10 is loaded, it will be supported in the loaded position by means of its rear axles 18 being held in the saddle means 76 of the arm assemblies 60 and 62 and its back bar 22 being in bearing engagement with the seat means 48. As evident from FIG. 2, the yolk means 46 is pivotably moved through more than 90° when moved from its loading to its loaded position. As a result, the longitudinal axis of the ATV 10 will extend upwardly from the tongue 26 and slope at an angle toward the rear of the transport vehicle 12. This will locate the center of gravity of the ATV 10, as determined by the ATV 10 itself, and the extensibly adjusted positions of the saddle means 76 of the arm assemblies, so that it is on the transport vehicle side of the pivot axis 94 of the yolk means 46. This angular attitude of the ATV 10, along with it being secured to the ATV carrier apparatus 14 in the manner described above provides stabilized and safe supporting of the ATV 10 on the carrier 14 of the present invention.

The hereinbefore mentioned safety chains 92 provided on both of the arm assemblies 60 and 62 are loopingly passed around the axles 18 of the loaded ATV 10, in the manner indicated in FIG. 3. The loops formed in this manner are preferably fixed such as by passing pins 100 (one shown) through aligned links of their respective safety chains and securing the pins by means of the retainer clips 102. The other ends of the safety chains 92 each have a suitable hook 104 (one shown) thereon, an those hooks are placed in engagement with suitable holes provided the transverse plate 33 of the receiver hitch 32.

While the principles of the invention have now been made clear in the illustrated embodients, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A carrier apparatus for carrying an all terrain vehcile on a transport vehicle, said all terrain vehicle having rear axles and a rearwardly extending back bar said transport vehicle being equipped with a trailer hitch receiver, said carrier apparatus comprising:
   (a) an elaongated tongue having a mounting end for attachment to the trailer hitch receiver of the transport vehicle, said tongue extending rearwardly from the transport vehicle when attached to the trailer hitch reciever thereof and having a distal end;
   (b) yolk means pivotably mounted on the distal end of said tongue for supportive attachment to the rear axles of the all terrain vehcile, said yolk means being pivotably movable between a loading position of extending from said tongue in a substantially horizontal plane for attachment to the rear axles of the all terrain vehicle to be loaded and a loaded position wherein said yolk means extends upwardly from said tongue and slopes angularly toward the mounting end thereof so as to support the rear axles of the all terrain vehicle above said tongue when the all terrain vehicle is moved with said yolk means to the loaded position above said tongue; and
   (c) seat means on said tongue intermediate the mounting and distal ends thereof for supportingly receiving the back bar of the all terrain vehicle when it is moved into the loaded position above said tongue.

2. A carrier apparatus as claimed in claim 1 wherein said yolk means supports the rear axles of the all terrain vehicle above the back bar thereof when the all terrain vehicle is in the loaded position above said tongue so that the longitudinal axis of the all terrain vehicle extends upwardly from said tongue and slopes angularly toward the mounting end thereof.

3. A carrier apparatus as claimed in claim 2 wherein said yolk means is adjustable for supporting the rear axles of the all terrain vehicle at an adjustably predetermined height above said tongue when the all terrain vehicle is in the loaded position above said tongue.

4. A carrier apparatus as claimed in claim 1 wherein said yolk means includes means for releasably securing said yolk means to the rear axles of the all terrain vehicle.

5. A carrier apparatus as claimed in claim 1 wherein said yolk means comprises:
   (a) a cross beam transversely mounted on the distal end of said tongue for pivotable movement about a transverse pivot axis;
   (b) a pair of arm means each mounted on a different one of the opposite ends of said cross beam for pivotable movement therewith and each defining an extending end member, said pair of arm means being disposed so that the distal end members thereof are in spaced apart parallel relationship with respect to each other and are normal with respect to said cross beam; and
   (c) a pair of saddle means each mounted on the end of a different one of the distal end members of said pair of arm means for supportive attachment to the rear axles of the all terrain vehicle to be carried.

6. A carrier apparatus as claimed in claim 5 wherein said yolk means further includes means for adjusting the spaced relationship between the distal end members of said pair of arm means.

7. A carrier apparatus as claimed in claim 5 wherein said yolk means further comprises:
   (a) said pair of saddle means each extending axially from its respective one of the distal end members of said pair of arm means; and
   (b) means of adjustably predetermining the axially extended position of each of said pair of saddle means.

8. A carrier apparatus as claimed in claim 5 and further including means on said pair of saddle means for releasable securing thereof to the rear axles of the all terrain vehicle to be carried.

9. A carrier apparatus as claimed in claim 1 wherein said yolk means comprises:
   (a) a cross beam transversely disposed on the distal end of said tongue and pivotably connected intermediate its opposite ends for movement above a transverse pivot axis;
   (b) a pair of right angle elbows each having a mounting end member extending axially from different ones of the opposite ends of said cross beam and each having an distal end member, said elbows being disposed so that the distal end members thereof are spaced apart and parallel with respect to each other and are normal with respect to said cross beam; and
   (c) a pair of saddle means each extending axially from the end of a different one of the distal end members of said pair of elbows for supportive attachment to the rear axles of the all terrain vehicle to be carried.

10. A carrier apparatus as claimed in claim 9 wherein said cross beam is tubular and the mounting end members of said pair of elbows are adjustably and telescopically mounted in their respective opposite ends of said cross beam for adjustably predetermining the spaced apart relationship of the distal end members thereof.

11. A carrier apparatus as claimed in claim 9 wherein said yolk means further comprises:
    (a) said distal end member of each of said pair of elbows defining a bore; and
    (b) said pair of saddle members each including,
        I. A shank telescopically and adjustably disposed in the bore defined by the distal end member of its respective one of said pair of elbows for adjustably predetermining the axially extending position of said saddle means,
        II. A clevis mounted on the distal end of said shank and disposed so as to open axially from said shank.

12. A carrier apparatus as claimed in claim 9 and further comprising:
    (a) a pair of chains each having one end fixedly attached to one side of a different one of said pair of saddle means and having a free end; and
    (b) means on the opposite side of each of said pair of saddle means for releasably securing the free end of its respective one of said pair of chains thereto.

13. A carrier apparatus as claimed in claim 9 and further comprising:
 (a) a pair of chains each having one end fixedly attached to a different one of said pair of saddle means and each having a free end; and
 (b) hook means on the free end of each of said pair of chains for demountable connection to the trailer hitch receiver of the transport vehicle when said tongue is attached thereto.

14. A carrier apparatus as claimed in claim 1 wherein said seat means includes means for releasably securing the back bar of the all terrain vehicle thereto when the back bar is supportingly received therein.

* * * * *